United States Patent [19]

Blowers, Sr.

[11] Patent Number: 4,776,762

[45] Date of Patent: Oct. 11, 1988

[54] WINDMILL

[76] Inventor: Leo W. Blowers, Sr., 1518 Poplar La., Ridgecrest, Calif. 93555

[21] Appl. No.: 24,389

[22] Filed: Mar. 11, 1987

[51] Int. Cl.[4] ............................................. F03D 7/06
[52] U.S. Cl. ..................................... 416/119; 416/17; 416/197 A; 416/44
[58] Field of Search ................. 416/17, 111, 118, 119, 416/197 A, 23, 24, 44 A

[56] References Cited

U.S. PATENT DOCUMENTS

| | | | |
|---|---|---|---|
| 391,539 | 10/1880 | Lard | 416/118 |
| 651,633 | 6/1900 | Leibundgut | 416/118 |
| 3,976,396 | 8/1976 | Antogini | 416/117 X |
| 4,004,861 | 1/1977 | Soules | 416/119 |
| 4,276,481 | 6/1981 | Parker | 416/119 |
| 4,365,934 | 12/1982 | Mason | 416/17 |

FOREIGN PATENT DOCUMENTS

| | | | |
|---|---|---|---|
| 677693 | 6/1939 | Fed. Rep. of Germany | 416/108 |
| 2717379 | 10/1978 | Fed. Rep. of Germany | 416/197 A |
| 2718608 | 11/1978 | Fed. Rep. of Germany | 416/111 |
| 304514 | 1/1929 | United Kingdom | 416/111 |

Primary Examiner—Everette A. Powell, Jr.

[57] ABSTRACT

A power conversion turbine for actuation by fluid in motion such as, for example the wind, with a body supported to rotate about a central axis and carrying a plurality of vanes spaced from said axis and being movable about respective vane axes parallel to said central axis and which vanes are circumferentially spaced from each other and dimensioned such that, when said vanes are in a FIRST closed position they collectively form a substantially unbroken cylindrical surface and are selectively movable from said FIRST position to a fully open SECOND position and said vanes including interconnecting means causing selected ones of said vanes to close as one or more opposing vanes are caused to move from the first to the second position by reason of passage of fluid and means integrally connected with said interconnecting means for infinitely varying the degree of opening of the vanes between fully closed and fully open positions. An auxiliary strip may be provided along the full length of the inner surface of each vane near the leading edge to facilitate and accelerate the initial opening movement of the vanes.

6 Claims, 3 Drawing Sheets

WINDMILL

SUMMARY OF THE INVENTION

This invention relates generally to a turbine intended to be driven by a flow of fluid and is graphically represented as a windmill of the horizontal axis or Chinese type.

These types of turbines used as windmills have had the disadvantage that the vanes, when passing the lee side, make an uncontrolled jibing movement attended with shocks and vibrations causing uneven running. One attempt to control this jibing movement is shown and described in U.S. Pat. No. 4,032,257 Issued June 28, 1977 to Hendrick de Haas. Through a gear and clutch mechanism described in the patent, the vanes are engaged in the power position and free wheel into the position parallel to the wind flow when on the lee side.

In all of the known turbines of this type, however, the vanes and framework present a more or less open appearance to the wind, for example, and a certain amount of unwanted turbulence is inevitable.

According to the present invention, the vanes traversing the lee side of the turbine present an unbroken cylindrical surface. The vanes are biased to this position through an interconnecting means with one or more opposing vanes which are in the jibing mode for accepting the force of the wind.

Another feature of the present invention resides in the ability to utilize the interconnecting means to infinitely vary the position of the vanes between the fully closed position whereby they collectively present an unbroken cylindrical surface and the fully open positions for maximum torque.

The mechanism for accomplishing this is such that it is operable while the turbine is in operation to diminish or stop the interaction of the blades with the fluid flow.

The swinging in of the vanes on the lee side, while in operation, serves to increase the flywheel effect by moving most of their mass closer to the axis of rotation. This, along with the obvious decrease in resistance to fluid flow, greatly increases the efficiency of the turbine.

One embodiment of the invention includes an auxilliary strip along the inside of the leading edge of each vane. This strip is effective to cause a turbulence in the vicinity of the vane tip which is effective in augmenting the outward movement of the vane.

DETAILED DESCRIPTION

Figure 1:
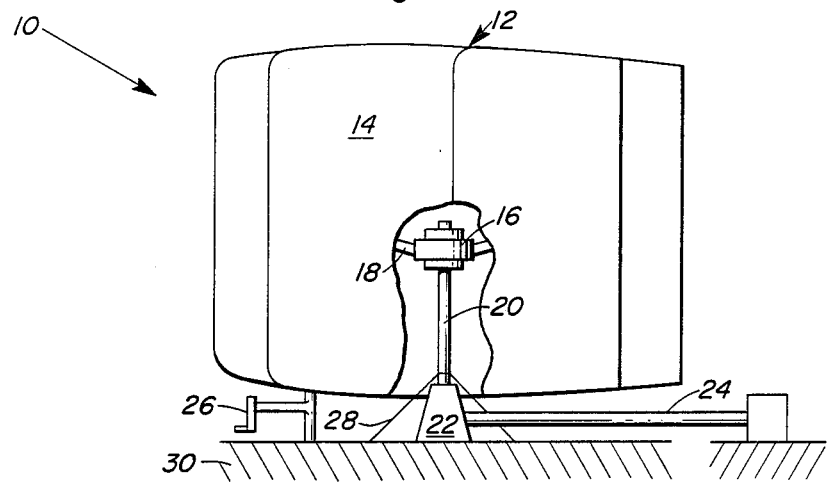
FIG. 1 is a side elevational view of a vertical axis turbine according to the present invention, with some parts broken away for clarity.

Referring now to FIGS. 1-5, a windmill turbine of the horizontal type there shown, designated by the numeral 10, has a rotor body 12 comprising a number of vanes 14 attached to a central hub 16 by means of radial arms 18. The hub 16 is on a shaft 20, mounted for rotation through a gearbox 22 to transmit power through an output shaft 24.

A control mechanism is illustrated generally at 26 and a number of guy wires are shown at 28. The whole is supported on a fixed foundation indicated at 30.

Figure 2:
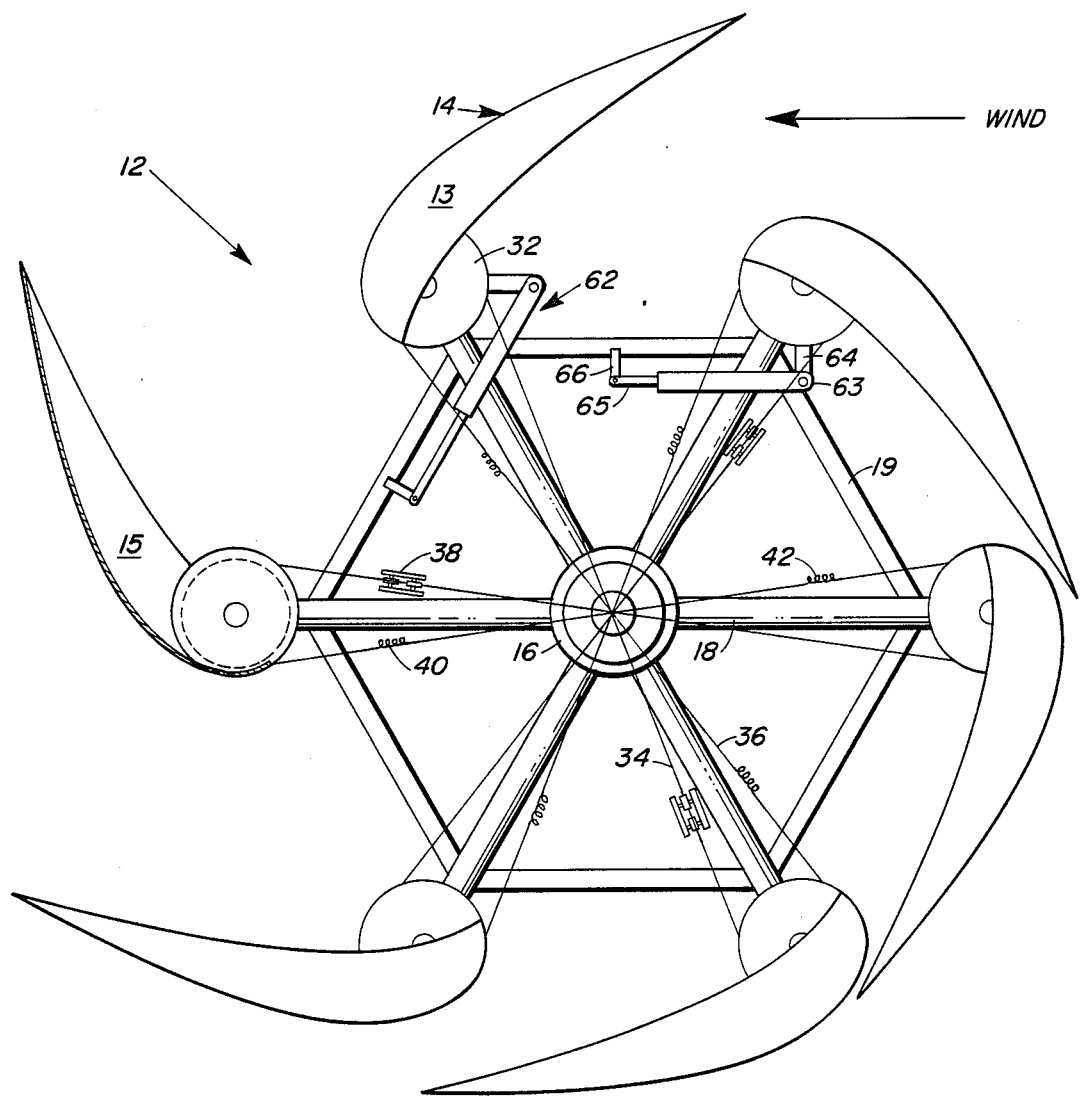
FIG. 2 is a top plan view of the turbine of FIG. 1, with some parts removed for simplicity.

The arrangement of the vanes 14 on hub 16 is better shown in FIG. 2. The numeral 13 designates the top plate of the vane and 15 the bottom plate. Thus the shape of the vanes takes on a scoop or shovel appearance. Each vane rotates on its own hub 32 and is interconnected with an opposite vane by means of cables 34, 36. One of the cables in each pair is threaded through a pulley arrangement 38 which cable is used to controll the opening and closing of the vanes vanes as desired.

The other of the cables 36 is held under tension by means of spaced springs 40, 42. These springs tend to keep the pairs of vanes in a particular relationship to each other while allowing some relative motion.

Each vane is restrained in movement by a fluid shock absorber device 65, for example, which acts to damp out unwanted hunting movements and to smooth out the desired movements. For this purpose, an arm is provided on each hub at 64 to pivotally mount one end of the absorber at 63 and the other end of the absorber 65 is attached to an arm 66 fastened to the framework of the rotor.

The apparatus shown for the purpose of interconnecting the vanes and for damping the movements thereof are illustrative only and other means could be utilized for those purposes such as mechanical gearing, electrical or hydraulic systems.

Figure 3:
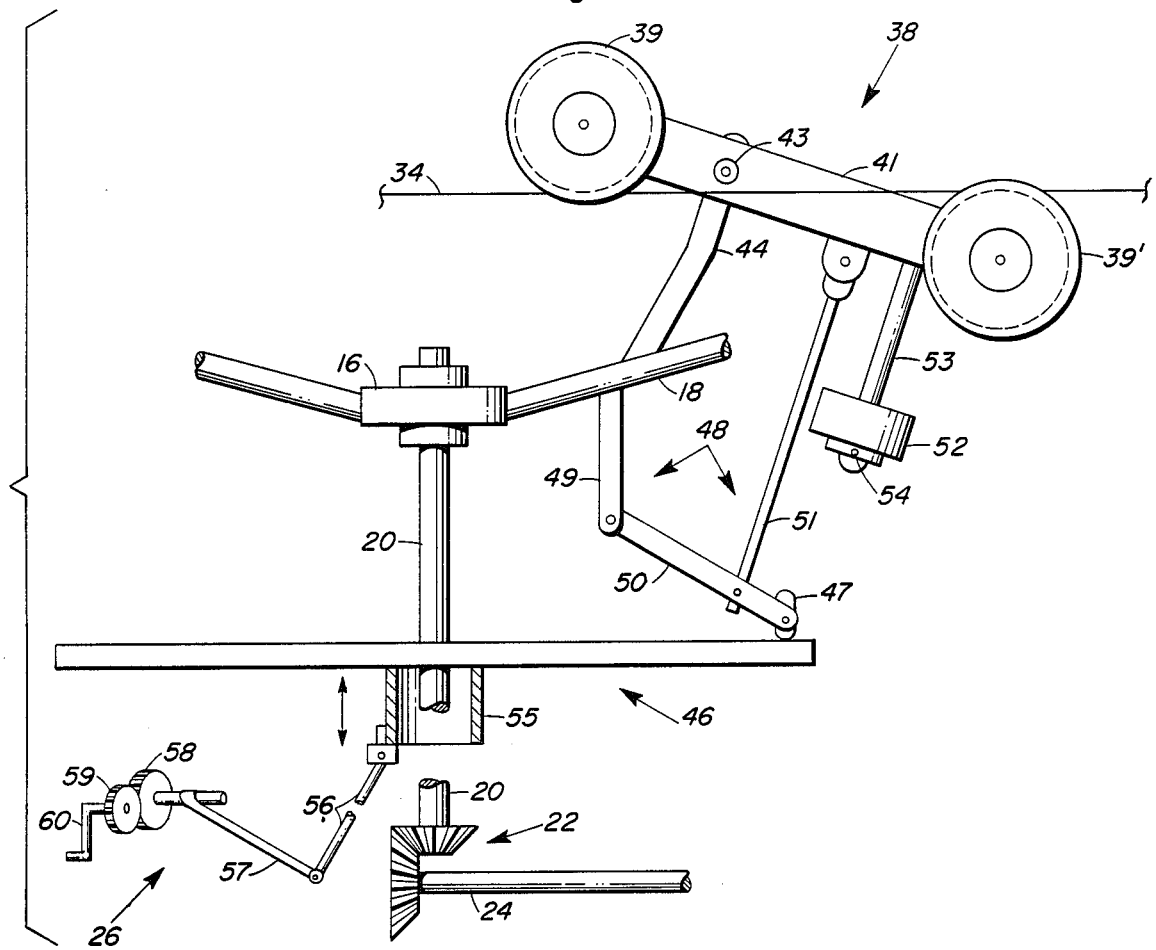
FIG. 3 is a fragmented and exploded view, having some parts enlarged and other diminished illustrating a vane control mechanism usuable with the turbine of FIGS. 1 and 2.

In FIG. 3, the pulley arrangement 38 for closing the vanes, is shown in more detail. Two pulleys 39, 39' are situated on opposing sides of the cable 34 to be acted upon. The pulleys are mounted for rotation on opposite ends of a bar 41 pivotally mounted at 43 to an arm fixed on a radial arm 18 which is in turn mounted on the hub 16. Spaced from the arm 44 is a link 51 pivoted on one end to bar 41 and at the other end to a lever 50. The lever 50 is pivoted at one end to a bar 49 fixed to the same radial arm 18 as bar 44 and, at the other end, lever 50 carries a roller 47 which rests on a movable table device 46. The table 46 is mounted on a cylindrical bearing member 55 and the whole is journalled on shaft 20 so that it remains stationary with respect thereto except for reciprocal motion as desired and indicated by the arrows.

Also shown is a centrifugal governor arrangement comprising a sliding weight 52 which is fixed in a desired position on an arm 53 by means of a set screw 54.

Movement of the table 46 is accomplished by means of a linkage 56, 57 and gears 58, 59 and crank 60. When the table 46 is moved upwardly from the position shown, lever 50 will rotate upwardly causing bar 41 to rotate around pivot 53 and cause the pulleys 39, 39' to shorten the length of cable 34.

Figure 2A:
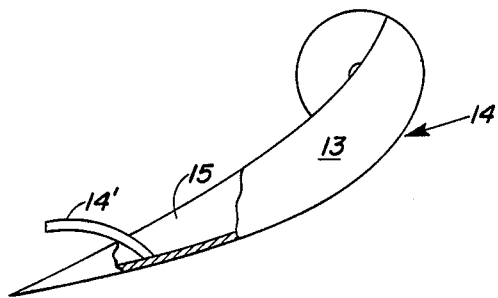
FIG. 2A is a top plan view of a modified vane for use with the invention according to FIG. 1.
Figure 4:
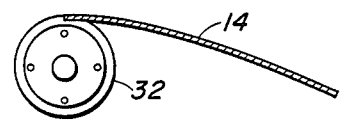
FIG. 4 is a top view of a vane with the top plate removed for detail.
Figure 5:
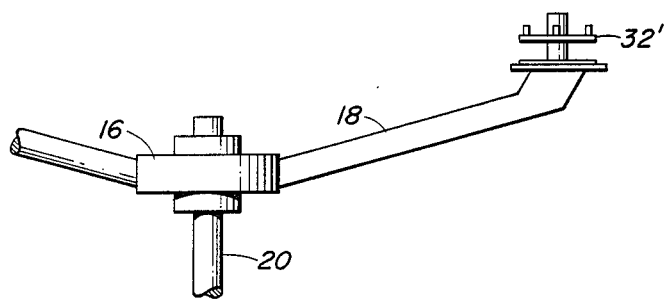
FIG. 5 is a detail view, in side elevation, of the central hub and arm of the turbine of FIG. 1.
Figure 6:
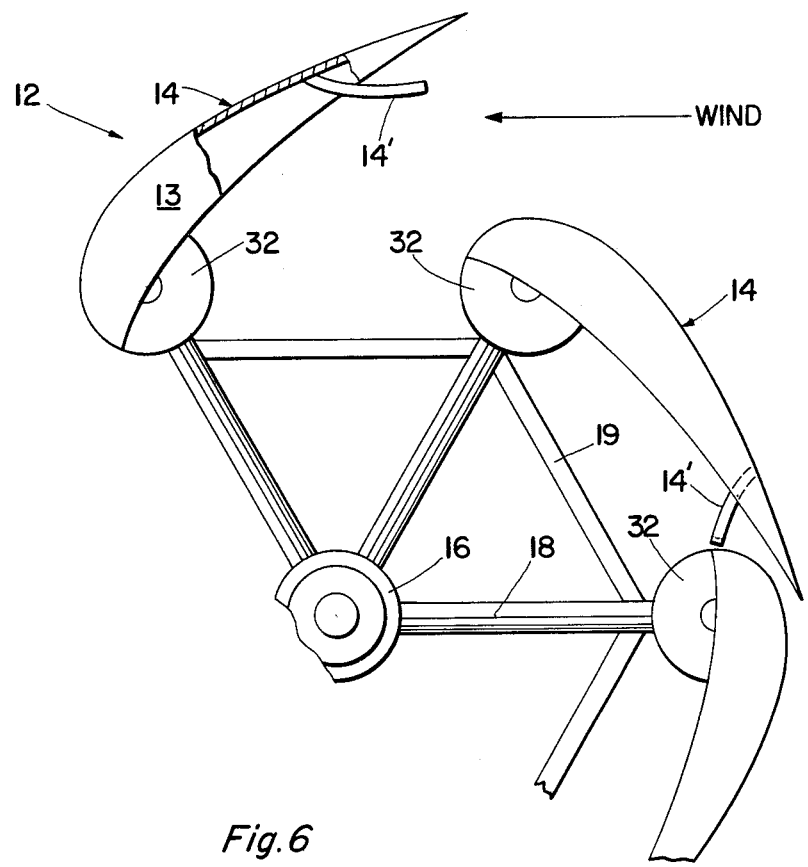

Opening of the vanes may be initially augmented by the placement of an auxiliary strip along the inside of the leading edge of each vane as shown at 14' in FIG. 2A. As the vanes start to open under centrifugal force, fluid entering partly impinges on the full length of auxilliary strips 14' and a turbulence is created which causes greater force to be applied to that area of the vane in an outward direction and thus facilitate a more rapid initial movement in the opening of the vane.

Although the embodiment shown and described has its axis in the vertical position, it is understood that the turbine operation would be the same no matter what orientation the shaft 20 has with respect to the earth. In the horizontal position, however, the vanes would be aided both in opening and closing by the action of the forces of gravity.

I claim:

1. A turbine or the like comprising:

a support;

a body fixed on said support for rotation about a central axis;

a plurality of vanes pivotally mounted on said body along respective vane axes peripheraly spaced from said central axis and equally spaced from each other;

each said vane being movable on its respective axis to and from a FIRST or closed position and a SECOND or fully open position;

said vanes being contoured and dimensioned such that, when said vanes are all in said FIRST position they collectively present an outer surface in the form of a cylinder;

cable means interconnecting each said vane with at leat one other, opposing vane, operative by reason of said one vane opening, to cause one or more opposing vanes to close; and means cooperatively connected with said vanes and said interconnecting means for selectively, manually changing the effective length of the cables between each pair of vanes causing all of said vanes to be simultaneously closed or the amount of opening to be diminished while said body is rotating or at rest.

2. Apparatus according to claim 1 wherein:

said central axis is oriented horizontally with respect to the earth's surface.

3. Apparatus according to claim 2:

and an auxilliary strip along the inside of each blade to aid in initial opening of the vane.

4. Apparatus according to claim 1:

and an auxilliary strip along the inside of each blade to aid in initial opening of the vane.

5. A turbine or the like comprising:

a support;

a body fixed on said support for rotation about a central axis;

a plurality of vanes mounted on said body for pivotal movement about respective vane axes spaced from said central axis and from each other;

each said vane being movable on its respective axis from a FIRST or closed position to a SECOND or fully open position;

said vanes being so contoured and dimensioned that, when said vanes are all in the said FIRST position, their outer surfaces present an unbroken cylindrical form; and an auxilliary strip along the inside of each blade to aid in initial opening of the vane.

6. Apparatus according to claim 5 wherein:

said central axis is oriented horizontally with respect to the earth's surface.

* * * * *